(12) United States Patent
Girault (10) Patent No.: US 7,590,846 B2
(45) Date of Patent: Sep. 15, 2009

(54) PUBLIC KEY CRYPTOGRAPHIC METHOD OF PROTECTING AN ELECTRONIC CHIP AGAINST FRAUD

(75) Inventor: Marc Girault, Caen (FR)

(73) Assignee: France Telecom, Paris (FR)

( * ) Notice: Subject to any disclaimer, the term of this patent is extended or adjusted under 35 U.S.C. 154(b) by 589 days.

(21) Appl. No.: 10/761,040

(22) Filed: Jan. 20, 2004

(65) Prior Publication Data

US 2004/0193890 A1 Sep. 30, 2004

(51) Int. Cl.
H04L 9/32 (2006.01)
(52) U.S. Cl. .......................... 713/172; 705/67
(58) Field of Classification Search ................ 713/168, 713/193–194; 726/20, 34–35; 705/66–67
See application file for complete search history.

(56) References Cited

U.S. PATENT DOCUMENTS

| | | | | |
|---|---|---|---|---|
| 4,926,480 | A * | 5/1990 | Chaum | 705/69 |
| 4,995,082 | A | 2/1991 | Schnorr | |
| 5,867,577 | A * | 2/1999 | Patarin | 705/67 |
| 7,110,545 | B2 * | 9/2006 | Furuya et al. | 380/259 |
| 2001/0016910 | A1 * | 8/2001 | Tanimoto et al. | 713/172 |
| 2002/0129247 | A1 * | 9/2002 | Jablon | 713/169 |
| 2003/0182554 | A1 * | 9/2003 | Gentry et al. | 713/171 |

FOREIGN PATENT DOCUMENTS

| | | |
|---|---|---|
| EP | 0325238 A2 * | 7/1989 |
| EP | 0 666 664 A1 | 2/1995 |
| EP | 0 723 251 A2 | 1/1996 |
| WO | WO 03/001464 A1 | 6/2002 |
| WO | WO 03/017569 A1 | 8/2002 |
| WO | WO 03/056750 A2 | 12/2002 |

OTHER PUBLICATIONS

Jacques Stern, et al., "Cryptanalysis of the OTM Signature Scheme from FC'02", Dec. 14, 2002.

* cited by examiner

Primary Examiner—Gilberto Barron, Jr.
Assistant Examiner—Venkat Perungavoor
(74) Attorney, Agent, or Firm—Cohen Pontani Lieberman & Pavane LLP (57) ABSTRACT

An asymmetrical cryptographic method of protecting an electronic chip against fraud in transactions between the electronic chip and an application, involving calculating an authentication value V from input parameters in the electronic chip. The chip produces a pseudo-random number r specific to the transaction by means of a serial pseudo-random generator included in the chip. The chip sends the application a parameter x calculated by the application prior to the transaction, linked to the random number r by a mathematical relationship, and stored in a data memory of the chip. The chip calculates a parameter y constituting the whole or a portion of the authentication value V by means of a serial function whose input parameters are at least the random number r specific to the transaction and a private key s belonging to an asymmetrical pair of keys. The chip sends the authentication value V to the application, and the application verifies the authentication value V by means of a verification function whose input parameters consist exclusively of public parameters including at least the public key p.

32 Claims, 2 Drawing Sheets

PUBLIC KEY CRYPTOGRAPHIC METHOD OF PROTECTING AN ELECTRONIC CHIP AGAINST FRAUD

FIELD OF THE INVENTION

The field of the present invention is that of cryptography. The invention relates in particular to cryptographic methods of protecting an electronic chip against fraud in transactions between the chip and an application.

The invention finds a highly advantageous application in protecting hard-wired logic or microprocessor-based integrated circuit chips from fraud, in particular the chips in prepaid cards used in diverse transactions, such as making telephone calls, purchasing items from an automated dispenser, paying parking charges at a parking meter, and paying for a service such as a public transport service or for the provision of infrastructures (tolls, museums, libraries, etc.).

BACKGROUND OF THE INVENTION

At present, prepaid cards are open to various types of fraud. A first type of fraud consists in unauthorized duplication of the card, often known as "cloning". A second type of fraud consists in modifying the data associated with a card, in particular the amount of credit registered in the card. Cryptography is used to combat these kinds of fraud, firstly by authenticating the card and/or data by means of a digital signature, and secondly by using encryption when it is necessary to protect the confidentiality of the data. Cryptography, which can be either symmetrical or asymmetrical, uses two entities, which in the case of authentication comprise a verifier and an object to be verified. When cryptography is symmetrical (or of the "secret key" type, these two terms being interchangeable), the two entities share exactly the same information, in particular a secret key. When cryptography is asymmetrical (or of the "public key" type, these two terms being interchangeable), one of the two entities has a pair of keys of which one is secret and the other is public; there is no shared secret key. Many systems use only symmetrical cryptography for prepaid cards, especially when the chip is of the "hard-wired logic" type, because asymmetrical cryptography is still slow and costly. The first authentication mechanisms developed for symmetrical cryptography comprises calculating once and for all an authentication value that is different for each card, storing it in the memory of the card, reading it during each transaction, and verifying it by interrogating an application of the network supporting the transaction and in which authentication values that have already been assigned are either stored or recalculated. Those mechanisms provide insufficient protection, since the authentication value can be misappropriated, reproduced, and played back fraudulently, because it is always the same for a given card, enabling the card to be cloned. To combat cloning, passive card authentication mechanisms are replaced by active authentication mechanisms that can also assure data integrity.

The general principle of active symmetrical authentication mechanisms is as follows: during authentication, the electronic chip and the application calculate an authentication value by applying a function to a list of arguments determined at the time of each authentication; the list of arguments can include, firstly, a random number, which is an item of data determined by the application at the time of each authentication, secondly, an item of data contained in the electronic chip, and, thirdly, a secret key known to the electronic chip and to the application. If the authentication value calculated by the electronic chip is identical to the authentication value calculated by the application, the electronic chip is deemed to be authentic and the transaction between the electronic chip and the application is authorized.

Authentication mechanisms of the above kind are well known in the art, but most of them demand calculation capacities at least equal to those of a microprocessor. Those mechanisms are therefore suitable for microprocessor-based cards, but are rarely suitable for hard-wired logic chips, which have calculation capabilities that are much more rudimentary.

A first step forward was achieved when it became possible to integrate active symmetrical authentication mechanisms into hard-wired logic chips. For example, French Patent Application No. FR 2 826 531 published on Dec. 27, 2002 describes a method of specifying such mechanisms. It should be observed that, as taught by the above-mentioned French Patent Application, the authentication value produced by those mechanisms can also be interpreted as a sequence of pseudo-random bits and, by varying at least one of the input parameters, the method of calculating the authentication value becomes a method of generating pseudo-random bits.

However, secret key mechanisms require the verification device responsible for authenticating the chip, such as a device in a public telephone, an electronic payment terminal, or a public transport gate, to know the secret key held by said chip. This is a major drawback in that, if said device is required to be able to authenticate any chip issued in relation to the application, it must store either the secret keys of all the chips or a basic key, or master key, or mother key as it is otherwise known, enabling it to determine the secret key of any chip. In both cases, each device stores sufficient information to be able to determine the secret keys of all the chips issued, and therefore stores sufficient information for cloning any of them. It follows that successful hacking into any of the verification devices would negate the security of the entire application.

OBJECTS AND SUMMARY OF THE INVENTION

One object of the present invention is to integrate an active public key authentication mechanism into a hard-wired logic chip, in particular in applications deploying a large number of chips, which is generally the case with applications using hard-wired logic chips because they are of very low cost. No such mechanism exists at present. The reason for this is that public key mechanisms generally require numerous operations on large numbers, and are therefore unsuited to integration in hard-wired logic chips, in which the surface area of the silicon is extremely small, and whose calculation logic is reduced to extremely basic hard-wired operations. These basic operations are generally effected serially, in the sense that the operands are introduced sequentially, bit by bit, and this progressively modifies the state of an internal register whose final value serves as a basis for calculating the result of the function.

The present invention relates to active public key authentication mechanisms that can be implemented in a hard-wired logic card.

To be more precise, the present invention relates to an asymmetrical cryptographic method of protecting an electronic chip against fraud in transactions between the electronic chip and an application, more particularly suitable for hard-wired logic chips and more particularly intended for implementing an authentication mechanism that is free of the symmetrical cryptography drawbacks mentioned previously, so as to enhance the security of the entire application, and in particular so as to make cloning more difficult.

The above-mentioned object and other objects are attained in accordance with one aspect of the present invention directed to an asymmetrical cryptographic method of protecting an electronic chip against fraud in transactions between the electronic chip and an application, involving calculating an authentication value V from input parameters in the electronic chip. The chip produces a pseudo-random number r specific to the transaction by means of a serial pseudo-random generator included in the chip. The chip sends the application a parameter x calculated by the application prior to the transaction, linked to the random number r by a mathematical relationship, and stored in a data memory of the chip. The chip calculates a parameter y constituting the whole or a portion of the authentication value V by means of a serial function whose input parameters are at least the random number r specific to the transaction and a private key s belonging to an asymmetrical pair of keys. The chip sends the authentication value V to the application, and the application verifies the authentication value V by means of a verification function whose input parameters consist exclusively of public parameters including at least the public key p.

Another aspect of the invention is directed to an electronic chip device adapted to implement the above asymmetrical cryptographic method of protecting the electronic chip against fraud in transactions between the electronic chip and an application, by the electronic chip calculating an authentication value V from input parameters. The device comprises a serial pseudo-random generator for producing a random number r specific to the transaction, first memory means for storing one or more values of the parameter x calculated prior to the transaction by the application and linked by a mathematical relationship to the value of the random number r, means for sending the parameter x linked to the random number r specific to the transaction from the chip to the application, means for executing a serial function having as input parameters at least the random number r specific to the transaction and a private key s belonging to an asymmetrical pair of keys (s, p) and providing as output a parameter y, and output means adapted to construct the authentication value V from at least the parameter y.

Another aspect of the invention is directed to a verification device for executing an asymmetrical cryptographic method of the invention for protecting an electronic chip against fraud in transactions between the electronic chip and an application. Such method includes verifying an authentication value V calculated by the electronic chip from exclusively public parameters. The device comprises means for executing the verification function taking as input at least the authentication value V and the public key p.

A method according to the invention has the advantage of enabling an authentication value V to be produced that can be verified by means of public parameters alone, although it is produced exclusively by serial functions, i.e. functions that process sequentially the bits of the parameters that constitute its input.

The input parameters of the cryptographic method and device are processed in the serial function that supplies as output an item of data dependent on some or all of the input parameters.

The input parameters of the method and device belong to a list that, in the case of implementing an authentication mechanism, comprises at least an identifier I, a private secret key s, a public key p corresponding to the private key s, a certificate for said public key, and a second random number t provided by the verification device.

The serial pseudo-random generator for calculating the random number r can advantageously be based on a symmetrical authentication method of the type described in the above-mentioned French Patent Application No. FR 2 826 531 published on Dec. 27, 2002. Accordingly, if f(K, M) designates the calculation function of a method of this kind, where K designates the symmetrical secret key and M designates all other operands of the function f, then the random number r can be produced by repeated application of the function f to different values of M, retaining the same value of K. For example, if the size of the output value z of f is equal to k bits and if the size of the random number r is equal to 16k bits, the first random number r used in the first authentication of the chip can be made equal to the concatenation of the sixteen output values $f(K,M_1)$, $f(K,M_2)$, ..., $f(K,M_{16})$; the second random number can be made equal to the concatenation of the sixteen output values $f(K,M_{17})$, $f(K,M_{18})$, ..., $f(K,M_{32})$, etc. , all the values $M_i$ being different from each other (the value of $M_{i+1}$ is typically obtained by incrementing the value of $M_i$). There are many other ways to use the authentication method for pseudo-random generation.

The serial function contains additions, subtractions and left- or right-shifts. These operations can very easily be performed sequentially.

BRIEF DESCRIPTION OF THE DRAWINGS

Other features and advantages of the invention become apparent in the course of the following description given with reference to the accompanying drawings of particular embodiments provided by way of non-limiting example.

DETAILED DESCRIPTION OF THE DRAWINGS

Figure 1:
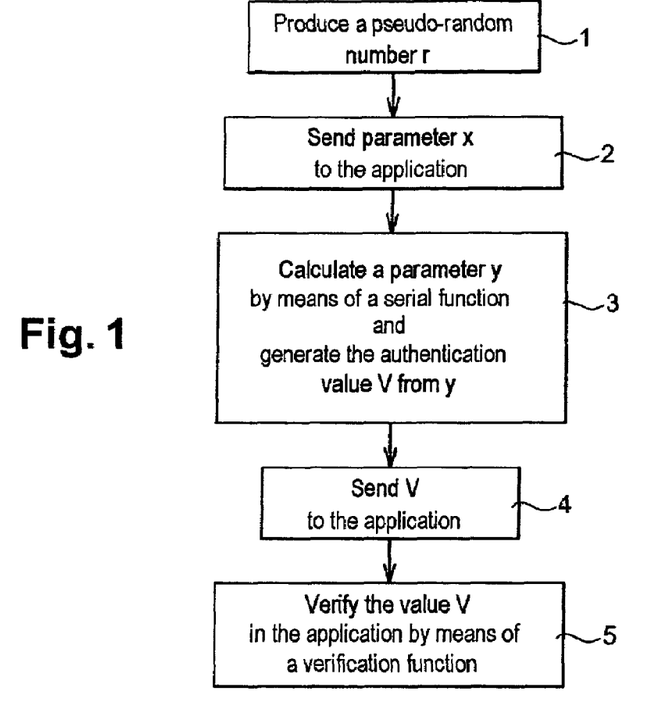
FIG. 1 is a flowchart of a method in accordance with the invention.

FIG. 1 is a flowchart of an asymmetrical cryptographic method of the invention for protecting an electronic chip against fraud in transactions between the electronic chip and an application.

The method includes performing a calculation in the chip to determine an authentication value from input parameters.

In a first step 1 of the method, the chip produces a pseudo-random number r by means of a serial pseudo-random generator included in the chip. The random number r is specific to the transaction.

In a second step 2 of the method, a parameter x is sent from the chip to the application. The parameter x is calculated prior to the transaction by the application and is stored in the data memory of the chip. The parameter x is linked to the random number r by a mathematical relationship. The application calculates at least one parameter x and preferably calculates several parameters. In one particular embodiment, the parameters x are the result of applying a mathematical function to values taken successively from a given set for a given chip. The set is such that the various values of the random number r generated by the chip are included in that set.

Thus the mathematical function linking the random numbers r and the parameters x typically comprises an exponential function in a set G provided with an operation having at least the property of being associative and denoted in the form of a multiplication, i.e. the function is $x=g^r$, where r designates an integer and g designates an item from said set G chosen beforehand by the application.

The pseudo-random number r is different for each chip and for each authentication. It is calculated twice, the first time by the application and the second time by the chip itself. After calculating r, the application calculates the corresponding x. The application then stores at least one value of x in the chip when customizing it. The application advantageously stores a plurality of values of x. Since the application and the chip must produce the same value of r, it is of course imperative for the pseudo-random generator of the application and that of the chip to be strictly identical.

g can advantageously be either the same for all the electronic chips linked to the application or specific to the chip. When specific, g is an integral part of the public key p of the electronic chip. Typical examples of sets G are the group $Z_n^*$ of positive or zero integers less than n and prime with n (where n designates any positive integer), or any elliptical curve constructed on a finite body.

In a third step 3 of the method the chip calculates a parameter y by means of a serial function whose input parameters are at least the random number r specific to the transaction and a private secret key s belonging to an asymmetrical pair of keys (s, p), the parameter y constituting the whole or a portion of the authentication value V. The serial function is an arithmetical function.

In a fourth step 4, the chip sends the authentication value V to the application.

In a fifth step 5 of the method, the application verifies said authentication value V by means of a verification function whose input parameters are exclusively public parameters and include at least the public key p.

Figure 2:
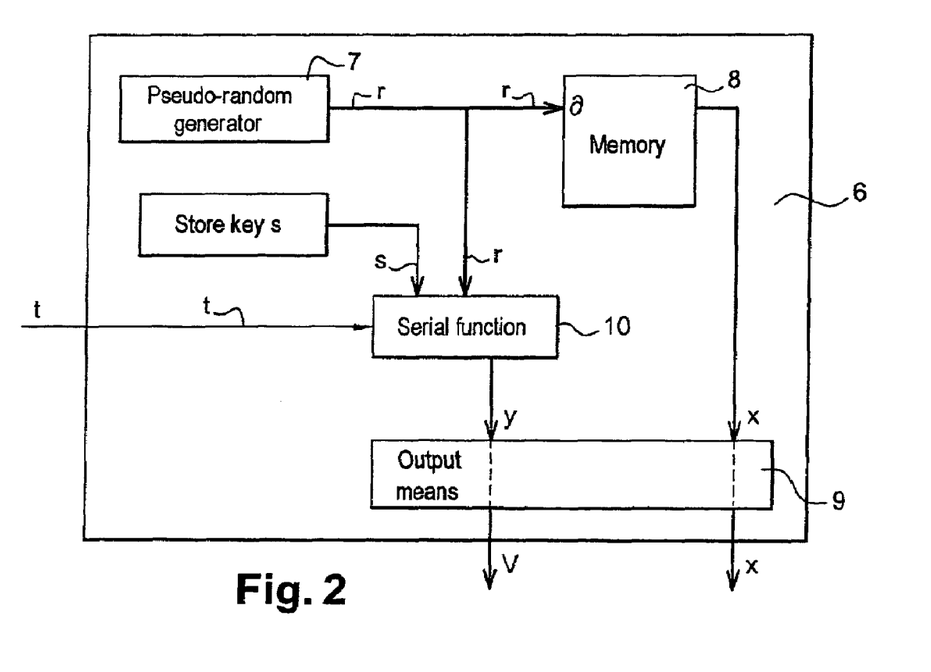
FIG. 2 is a diagram of an electronic chip device in accordance with the invention.

FIG. 2 shows diagrammatically a device of the invention including an electronic chip. The device executes an asymmetrical cryptographic method of the invention for protecting the electronic chip against fraud in transactions between the electronic chip and an application, the method comprising the electronic chip calculating an authentication value V from input parameters.

The device 6 comprises:
- a serial pseudo-random generator 7 producing a random number r specific to the transaction,
- first memory means 8 for storing one or more parameters x calculated by the application prior to the transaction, each of said parameters x being linked by the same mathematical relationship to a value of the random number r within a set of values that can be produced by the serial pseudo-random generator,
- first output means 9 for supplying the parameter x linked to the random number r specific to the transaction,
- means 10 for executing a serial function having for input parameters at least the random number r specific to the transaction and a private key s belonging to an asymmetrical pair of keys (s, p), said parameter y constituting the whole or a portion of the authentication value V, and
- second output means 9 for supplying the authentication value V after said value is constructed from at least the parameter y.

In the embodiment described with reference to FIG. 2, the serial pseudo-random generator 7 uses a symmetrical authentication method of the type described in the above-mentioned French Patent Application No. FR 2 826 531 published on Dec. 27, 2002. Accordingly, if f(K,M) designates the calculation function of a method of this kind, in which K designates the symmetrical secret key and M designates all other operands of the function f, then the random number r can be produced by repeated application of the function f to different values of M, retaining the same value of K. For example, if the size of the output value z of f is equal to k bits and if the size of the random number r is equal to 16k bits, the first random number r used in the first authentication of the chip can be made equal to the concatenation of the sixteen output values $f(K,M_1), f(K,M_2), \ldots, f(K,M_{16})$; the second random number can be made equal to the concatenation of the sixteen output values $f(K,M_{17}), f(K,M_{18}), \ldots, f(K,M_{32})$, etc., all the values $M_i$ being different from each other.

Figure 3:
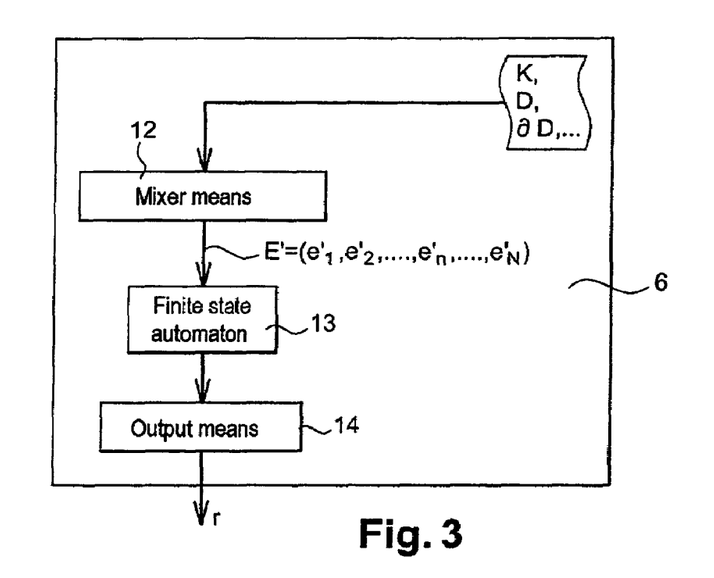
FIG. 3 is a diagram of one embodiment of a pseudo-random generator for an electronic chip device in accordance with the invention.

FIG. 3 is a diagram of a serial pseudo-random generator 6 of the above kind. The generator comprises, firstly, means 12 for mixing some or all of the input parameters to supply at its output a data item $E'=(e'_1, e'_2, \ldots, e'_n, \ldots, e'_N)$ resulting from said mixing, secondly, a finite state automaton 13 that changes from an old state to a new state in accordance with a function depending at least on the old state and a value from the series of bits $(e'_1, e'_2, \ldots, e'_n, \ldots, e'_N)$, and, thirdly, output means 14 for calculating the value z from input arguments comprising at least one state of the automaton, and thereafter determining the value of the random number r chosen by concatenating sixteen successive output values $f(K,M_1), f(K,M_2), \ldots, f(K,M_{16})$. The input parameters of the mixing means 12 can be: a secret key K, data D internal to the chip, the memory address of the data D, data D' external to the chip, and a random number R' supplied by the application (this list is by no means exhaustive).

The mixing means 12 execute a mixing function MIX that can be a linear or non-linear function of the input data.

The scalar product of the input data is a first example of a linear function.

In another example of a linear function, the mixing means comprise a linear feedback shift register into which the bits of the input parameters are entered successively and influence the initial state of the register and/or the value of the feedback bits.

In a further example of a non-linear function, the mixing means comprise a non-linear feedback shift register into which the bits of the input parameters are entered successively. The output value S' can comprise one or more bits extracted from the content of this register.

A first example of the automaton 13 uses a Boolean circuit, i.e. a circuit which associates a vector $(A'_1, A'_2, \ldots, A'_k)$ of k bits with a vector $(A_1, A_2, \ldots, A_{k+1})$ of k+1 bits, where each bit $A'_i$ is obtained from the bits $(A_1, A_2, \ldots, A_{k+1})$ using basic operations such as exclusive-OR, OR (inclusive), AND, and NOT operations, and where $(A_1, A_2, \ldots, A_k)$ represents the old state of the automaton. The automaton has an internal state $(A_1, A_2, \ldots, A_k)$ of k bits and outputs a new state $(A'_1, A'_2, \ldots, A'_k)$ each time that a new vector $(A_1, A_2, \ldots, A_k, S'e')$ is present at the input of the Boolean circuit, the new vector comprising the internal state and the output of the mixing function MIX.

A second example of the automaton 13 uses bit transforms defined by tables of numbers. If k=8, it is possible to divide the byte $(A_1, A_2, \ldots, A_8)$ into two quads $(A_1, A_2, A_3, A_4)$ and $(A_5, A_6, A_7, A_8)$, for example, and then to apply to each quad either a transform T if the value of the output bit E'e' of the mixing function is 0 or a transform U if the value of E'e' is 1. The transform T is defined by a table that associates a quad value (a', b', c', d') with each quad value (a, b, c, d), and the same applies to the transform U.

When all the input values have been processed, the automaton 13 is in a certain final state $(F_1, F_2, \ldots, F_k)$ The output means 14 of the serial pseudo-random generator typically use an output function that is the identity function applied to the final state of the automaton and a concatenation operation.

The output means 14 comprise a memory region whose size is equal to the size of the random number r, for example, which is 16k bits.

The first memory means 8 for storing one or more parameters x typically comprise a non-volatile memory, possibly one that can be rewritten. The parameters x are programmed into the memory before the electronic chip is sold. The value of the random number r used to calculate the parameter x must be chosen so that the chip can calculate exactly the same value. In the serial pseudo-random generator described by way of example with reference to FIG. 2, this implies that the secret key K is shared by the chip and the application. Accordingly, before the chip is put into circulation, the application calculates a number of values of x by repeatedly applying the authentication method whose calculation function is denoted f hereinabove, and stores these values in the data memory of the chip. On each authentication, the chip recalculates the random number r and reads the corresponding value of the parameter x in the data memory. In the serial pseudo-random generator described by way of example with reference to FIG. 2, the correspondence between r and x is typically established by choosing for the value of $M_1$ information for determining the address of the value of x corresponding to that particular value of r, the value of $M_{i+1}$ for i greater than or equal to 0 being obtained by incrementing the value of $M_i$.

To economize on memory space, the parameter x can advantageously be made equal to the image of the item $g^r$ (and possibly other items, such as application data) produced by a hashing function h, rather than have it be equal to the item itself; in other words: $x=h(g^r,D)$, where D designates an optional field containing data related to the application, for example. D designates an amount in Euros decided on by the application, for example. In this case, each coupon represents an electronic coin and each authentication represents the spending of a coin.

The first output means 9 that output the parameter x linked to the random value r specific to the transaction typically comprise an input/output buffer.

Figure 4:
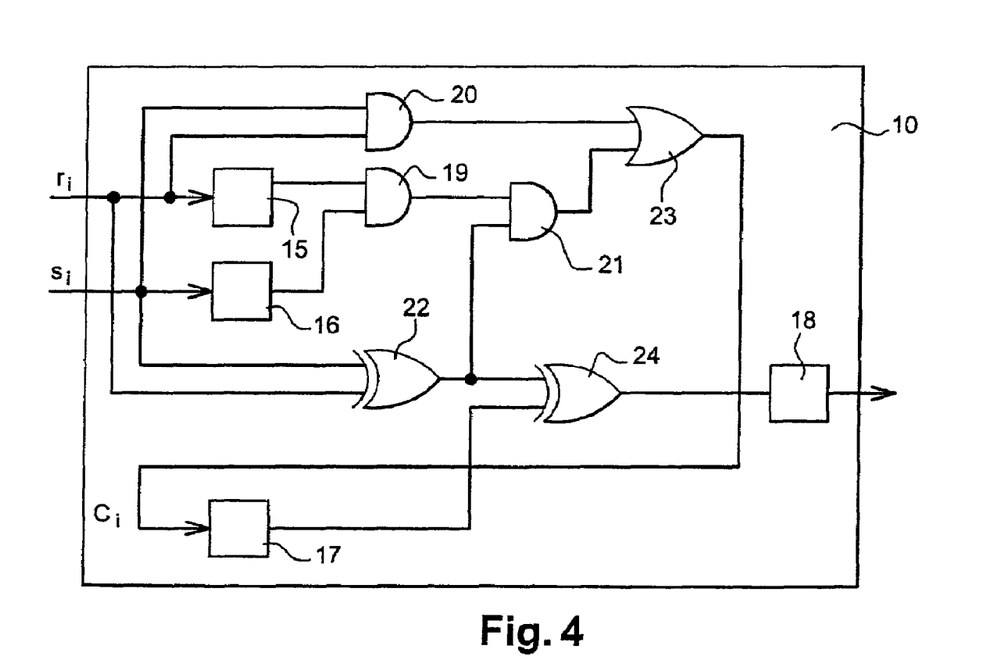
FIG. 4 is a diagram of one embodiment of means for executing a serial function for an electronic chip device in accordance with the invention.

One example of the means 10 for executing a serial function is described next with reference to FIG. 4. The input parameters of the serial function are the random number r and a private secret key s belonging to an asymmetric pair of keys (s, p). The key p is a public key.

The means 10 comprise a bit adder that calculates and takes into account a carry.

The value of the current bit $r_i$ of r is captured in a first register 15 and the value of the current bit $s_i$ of s is captured in a second register 16. A third register 17 captures the carry $c_i$ from previous bit additions. Finally, a fourth register 18 captures the bit $y_i$ obtained after addition of the values of the current bits $r_i$ and $s_i$ with the carry obtained in the preceding addition and corresponding to the content of the third register 17. The carry $c_i$ results from taking account of the carry generated on adding the preceding bits (the output of the AND gate 19, whose inputs are the outputs of the first two registers 15, 16) and the carry generated on adding the current bits (the output of the AND gate 20 whose inputs are the values of the current bits $r_i$ and $s_i$). An intermediate AND gate 21 generates a carry if a carry is generated on adding the preceding bits and when only one of the current bits is a 1, at the output of the exclusive OR gate 22 whose inputs are the values of the bits.

The carry is therefore the result of an OR operation 23 between the output of the intermediate AND gate 21 and the AND gate 20 whose inputs are the values of the current bits $r_i$ and $s_i$. This carry $c_i$ is captured in the third register 17 to be taken into account on adding the next bits of $r_i$ and $s_i$.

The bit $y_i$ results from adding the values of the current bits $r_i$ and $s_i$ (at the output of the exclusive-OR gate 22 whose inputs are the values of the current bits $r_i$ and $s_i$) and the value of the carry (at the output of the exclusive-OR gate 24 whose inputs are the output of the preceding exclusive-OR gate 22 and the output of the third register 17).

The outputs of the registers 15, 16, 17, 18 are initialized to 0.

This finally yields: $y_i=r_i+s_i+c_i (\text{mod} 2)$ and $c_{i+1}=r_i+s_i+c_i$ (div2), where $c_0$ is made equal to 0.

In one particular application, the serial function has a further input parameter in the form of a random number t supplied by the application.

After the chip has produced a random number r by the method described with reference to FIG. 2 and has then read the value of the parameter x in its data memory that corresponds to the value of said random number (for example using the function $x=g^r$), it sends the value of x to the application, whereupon the application sends the chip a random number t whose size is reduced to 1 bit.

Two situations then arise: if the value of t is 0 the chip chooses y=r and if the value of t is 1 the chip chooses y=r+s. How to implement this choice is well known to the person skilled in the art and is therefore not described here.

The authentication value V is taken as equal to y and is sent to the application.

Verification comprises testing the equation $g^y=x$ if t is equal to 0 or $g^y=xp$ if t is equal to 1, where p is the public key of the chip corresponding to its secret key s, as defined by the function $p=g^s$. If these parameters are made sufficiently large, it is not feasible to determine s from g and p using the discrete logarithm hypothesis, which is widely accepted at present.

In one particular application, a hashing function h can be used to calculate x. In this case, the verification equation becomes $h(g^y,D)=x$ if t is equal to 0 or $h(g^y/p,D)=x$ if t is equal to 1. To avoid any division in the verification equation, it is also possible to choose y=r−s rather than y=r+s, in which case the second verification equation becomes $h(g^y \cdot p,D)=x$. Another option is to choose $p=g^{-s}$ rather than $p=g^s$, which yields the following verification equations: $h(g^y,D)=x$ and $h(g^y \cdot p,D)=x$.

In the embodiments previously described, any chip other than the one that knows the secret value s has at most one chance in two of supplying an authentication value that the application recognizes as valid. This already makes a distinction between an authentic chip and a clone, but this distinction is insufficient in most real-life situations.

To reduce significantly the chances of successful cloning, one solution is to increase the number of bits m of the random number t. For example, the random number t can be a string of 64 bits ($t_{63}, t_{62}, \ldots, t_0$) in which only one bit is equal to 1. If i is the only suffix such that ti is equal to 1, then the value of y is made equal to $y=r+2^i s$, which is very easy to calculate sequentially, since this amounts to adding r and the integer obtained by left shifting s by i bits (if the more significant bits are on the left). The verification equation is then $g^y=xp^{2^i}$. Under these conditions, any chip other than the one knowing the secret value s has at most one chance in 64 of supplying an authentication value that the application would recognize as valid.

In one particular application, a hashing function h can be used to calculate x. In this case, the verification equation becomes: $h(g^y/p^{2^i},D)=x$. To avoid any division in the verification equation, it is also possible to choose $y=r-2^i s$ rather than $y=r+2^i s$, in which case the second verification equation becomes $h(g^y \cdot p^{2^i}, D) = x$. Another option is to choose $p = g^{-s}$ rather than $p = g^s$, which yields the verification equation $h(g^y \cdot p^{2^i}, D) = x$.

For the solution as described, and from the security point of view, it amounts to the same thing to choose for the value of t an integer from 0 to m−1 instead of the string t defined above, in which case y is taken as equal to $y = r + 2^t s$ and the verification equation is $g^y = xp^{2^t}$.

In one particular application, a hashing function h can be used to calculate x. In this case, the verification equation becomes: $h(g^y/p^{2^t}, D) = x$. To avoid any division in the verification equation, it is also possible to choose $y = r − 2^t s$ rather than $y = r + 2^t s$, in which case the second verification equation becomes $h(g^y \cdot p^{2^t}, D) = x$. Another option is to choose $p = g^{-s}$ rather than $p = g^s$, which yields the verification equation $h(g^y \cdot p^{2^t} D) = x$.

From the security point of view, it amounts to the same thing to choose for the value of t an integer from 0 to m−1 instead of the string t defined above, in which case y is taken as equal to $y = r + ts$ and the verification equation is $g^y = xp^t$.

In one particular application, a hashing function h can be used to calculate x. In this case, the verification equation becomes: $h(g^y/p^t, D) = x$. To avoid any division in the verification equation, it is also possible to choose $y = r − ts$ rather than $y = r + ts$, in which case the second verification equation becomes $h(g^y \cdot p^t, D) = x$. Another option is to choose $p = g^{-s}$ rather than $p = g^s$, which yields the verification equation $h(g^y \cdot p^t, D) = x$.

The random number t can of course take other values.

The second output means 9 (authentication value V) typically use an output function that is the identity function applied to the parameter y. The second output means 9 comprise a memory region whose size is equal to the size of the parameter y, for example.

During transactions between an application and an electronic chip of the invention, the application and the chip use an asymmetrical cryptographic method to protect the electronic chip against fraud, in which method the application uses a verification device of the invention to authenticate the chip. The device comprises means that execute the verification function of a method of the invention to verify the authentication value V calculated by the electronic chip using only public parameters that comprise at least the public key p linked to the secret key s of the chip.

In one of the embodiments of a method of the invention previously described, the verification device compares the result $(g^y)$ supplied by the mathematical function applied to the authentication value V either to the value x or to the product (xp) of the value x and the public key p of the chip corresponding to its secret key s, as a function of the value of the parameter t, where y is equal to the authentication value V and p is the public key of the chip corresponding to its secret key s, as defined by the function $p = g^s$.

The means typically comprise a computer.

I claim:

1. An asymmetrical cryptographic method for protecting a hard-wired electronic logic chip against fraud in transactions between the hard-wired electronic chip and an application, including calculating an authentication value V from input parameters in the electronic chip, said method comprising the steps of:
   producing at least one pseudo-random number r at the application before the hard-wired electronic chip is placed into circulation;
   calculating, at the application before the hard-wired electronic chip is placed into circulation, parameters x corresponding to the at least one pseudo random number r, each corresponding parameter x being linked to the pseudo random number r by a mathematical relationship;
   storing the corresponding parameter x in a data memory of the electronic chip before the hard-wired electronic chip is placed into circulation;
   producing, at the chip, the pseudo-random number r specific to the transaction via a serial pseudo-random generator included in the hard-wired electronic chip, said hard-wired electronic chip reading the stored corresponding parameter x calculated by the application before the hard-wired electronic chip is placed into circulation;
   sending from the hard-wired electronic chip to the application the corresponding parameter x calculated by the application, before the hard-wired electronic chip is placed into circulation, which is linked to the pseudo-random number r by the mathematical relationship and stored in the data memory of the hard-wired electronic chip;
   calculating, at the hard-wired electronic chip, a parameter y constituting an entire or a portion of the authentication value V via a serial function whose input parameters are at least the random number r specific to the transaction and a private key s belonging to an asymmetrical pair of keys;
   sending the authentication value V from the hard-wired electronic chip to the application; and
   verifying, at the application, said authentication value V via a verification function whose input parameters consist of public parameters including at least a public key p.

2. The method according to claim 1, wherein producing the random number r specific to the transaction comprises:
   mixing some or all of the input parameters via a mixing function and supplying a series of bits as an output of the mixing function;
   changing a state of a finite state automaton from an old state to a new state in accordance with a function depending at least on the old state and a value of the series of bits; and
   determining a series of random bits to form an entire or a portion of the random number r via an output function having input arguments including at least the state of the automaton.

3. The method according to claim 2, wherein one input parameter is a secret key K shared by the hard-wired electronic chip and the application and is stored in a protected memory region of the hard-wired electronic chip.

4. The method according to claim 1, wherein the mathematical relationship comprises a function $g^r$ in a set G of items g provided with an operation having at least an associative property.

5. The method according to claim 4, wherein the set G is a group $Z_n^*$ of positive or null integers less than n and prime with n, wherein n isa positive integer.

6. The method according to claim 4, wherein the set G is any elliptical curve constructed on any finite body.

7. The method according to claim 1, wherein the serial function is an arithmetical function executing operations from a list comprising addition, subtraction, and left-shifts or right-shifts.

8. The method according to claim 7, wherein the arithmetical function executes only addition.

9. The method according to claim 7, wherein the arithmetical function executes only subtraction.

10. The method according to claim 7, wherein the arithmetical function input arguments further include input parameters and the arithmetical function entails executing one of the operations $y=r$ and $y=r+s$ as a function of a value assigned by the application to an input parameter t of the serial function.

11. The method according to claim 10, wherein the mathematical relationship comprises a verification function $g^r$ in a set G of items g provided with an operation having at least an associative property and wherein the verification function compares a result obtained by applying the verification function to the authentication value V with either the value x or the product of the value x and the public key p of the hard-wired electronic chip corresponding to its secret key s, as a function of the parameter t, which comprises testing one of the equations $g^y=x$ and $g^y=xp$, as a function of the value of the parameter t, where y is equal to the authentication value V and p is the public key of the hard-wired electronic chip corresponding to its secret key s, as defined by the function $p=g^s$.

12. The method according to claim 7, wherein the arithmetical function has, for further input arguments, input parameters and comprises executing the operation $y=r$ or the operation $y=r-s$ as a function of a value assigned by the application to an input parameter t of the serial function.

13. The method according to claim 12, wherein the mathematical equation comprises a verification function $g^r$ in a set G of items g provided with an operation having at least the property of being associative and wherein the verification function compares the result obtained by applying the mathematical relationship to the authentication value V with the value x or with the product of the value x and the public key p of the hard-wired electronic chip corresponding to its secret key s, as a function of the value of the parameter t, which comprises testing the equation $g^y=x$ or the equation $g^y \cdot p=x$, as a function of the value of the parameter t, where y is equal to the authentication value V and p is the public key of the hard-wired electronic chip corresponding to its secret key s, as defined by the equation $p=g^s$.

14. The method according to claim 7, wherein the arithmetical relationship has, for further input arguments, input parameters and comprises executing the operation $y=r+2^i s$ as a function of a value assigned by the application to an input parameter t of the serial function, said parameter t comprising a string of m bits in which only one bit $t_i$ is equal to 1, m being a natural integer.

15. The method according to claim 14, wherein the mathematical relationship comprises a verification function $g^r$ in a set G of items g provided with an operation having at least an associative property and wherein the verification function tests the equation $g^y=xp^{2^i}$, as a function of the value of the parameter t, where y is equal to the authentication value V and p is the public key of the hard-wired electronic chip corresponding to its secret key s, as defined by the function $p=g^S$.

16. The method according to claim 7, wherein the arithmetical function has for, further input arguments, input parameters and comprises executing the operation $y=r+2^t s$ as a function of the value assigned by the application to an input parameter t of the serial function.

17. The method according to claim 16, wherein the mathematical relationship comprises a verification function $g^r$ in a set G of items g provided with an operation having at least an associative property and wherein the verification function tests the equation $g^y=xp^{2^t}$, as a function of the value of the parameter t, where y is equal to the authentication value V and p is the public key of the hard-wired electronic chip corresponding to its secret key s, as defined by the function $p=g^S$.

18. The method according to claim 7, wherein the arithmetical function has, for further input arguments, input parameters and executes the operation $y=r+ts$ as a function of the value assigned by the application to an input parameter t of the serial function, where t is an integer.

19. The method according to claim 18, wherein the mathematical relationship comprises a verification function $g^r$ in a set G of items g provided with an operation having at least an associative property and wherein the verification function compares the result obtained by applying the verification function to the authentication value V with the value x or the product of the value x and the public key p of the hard-wired electronic chip corresponding to its secret key s, as a function of the value of the parameter t, which comprises testing the equation $g^y=xp^t$, as a function of the value of the parameter t, where y is equal to the authentication value V and p is the public key of the hard-wired electronic chip corresponding to its secret key s, as defined by the function $p=g^S$.

20. The method according to claim 1, wherein the parameter x sent from the hard-wired electronic chip to the application is a result obtained by applying a hashing function to at least one item linked to the random number r by a mathematical relationship and to an optional field D containing data linked to the application.

21. The method according to claim 20, wherein the arithmetical function has, for further input arguments, input parameters and executes the operation $y=r+2^i s$ as a function of the value assigned by the application to an input parameter t of the serial function, said parameter t comprising a string of m bits in which only one bit $t_i$ is equal to 1, where m is a natural integer.

22. The method according to claim 21, wherein the mathematical relationship comprises a verification function $g^r$ in a set G of items g provided with an operation having at least an associative property and wherein the verification function tests the relationship $h(g^y/p^{2^i},D)=x$, as a function of the value of the parameter t, where y is equal to the authentication value V and p is the public key of the hard-wired electronic chip corresponding to its secret key s, as defined by the function $p=g^S$.

23. The method according to claim 21, wherein the mathematical relationship comprises a verification function $g^r$ in a set G of items g provided with an operation having at least an associative property and wherein the verification function tests the relationship $h(g^y \cdot p^{2^i},D)=x$, where y is equal to the authentication value V and p is the public key of the hard-wired electronic chip corresponding to its secret key s, as defined by the function $p=g^{-S}$.

24. The method according to claim 20, wherein the arithmetical function has, for further input arguments, input parameters and executes the operation $y=r-2^i s$ as a function of the value assigned by the application to an input parameter t of the serial function, said parameter t comprising a string of m bits in which only one bit $t_i$ is equal to 1, where m is a natural integer.

25. The method according to claim 24, wherein the mathematical relationship comprises a verification function $g^r$ in a set G of items g provided with an operation having at least an associative property and wherein the verification function tests the relationship $h(g^y \cdot p^{2^i},D)=x$, where y is equal to the authentication value V and p is the public key of the hard-wired electronic chip corresponding to its secret key s, as defined by the function $p=g^{-S}$.

26. The method according to claim 20, wherein the mathematical function comprises a verification function $g^r$ in a set G of items g provided with an operation having at least an associative property and wherein the parameter x sent from the hard-wired electronic chip to the application is a result obtained by applying a relationship of $x=h(g^r,D)$, where D designates an optional field containing data linked to the application and h is the hashing function.

27. The method according to claim 26, wherein the serial function has input arguments comprised of input parameters and executes either the operation y=r or the operation y=r+s as a function of the value assigned by the application to an input parameter t of the serial function and wherein the verification function compares the value x to the value h($g^y$,D) or the value h($g^y$·p,D) as a function of the value of the parameter t, where y is equal to the authentication value V and p is the public key of the hard-wired electronic chip corresponding to its secret key s, as defined by the equation p=$g^{-s}$.

28. The method according to claim 26, wherein the serial function has, for input arguments, input parameters and executes one of the operation y=r and the operation y=r+s as a function of the value assigned by the application to an input parameter t of the serial function and wherein the verification function compares the value x to the value h($g^y$,D) or the value h($g^y$·p,D) as a function of the value of the parameter t, where y is equal to the authentication value V and p is the public key of the hard-wired electronic chip corresponding to its secret key s, as defined by the equation p=$g^{-s}$.

29. The method according to claim 26, wherein the serial function has, for input arguments, input parameters and executes one of the operation y=r and the operation y=r−s as a function of the value assigned by the application to an input parameter t of the serial function and wherein the verification function compares the value x to the value h($g^y$,D) or the value h($g^y$·p,D) as a function of the value of the parameter t, where y is equal to the authentication value V and p is the public key of the hard-wired electronic chip corresponding to its secret key s, as defined by the equation p=$g^s$.

30. The method according to claim 7, wherein the set G is the group $Z_n^*$ of positive or null integers less than n and prime with n.

31. The method according to claim 7, wherein the set G is any elliptical curve constructed on any finite body.

32. A device including a hard-wired electronic chip and configured to implement an asymmetrical cryptographic method for protecting the hard-wired electronic chip against fraud in transactions between the hard-wired electronic chip and an application, said hard-wired electronic chip reading one or more stored values of a parameter x calculated by the application before the hard-wired electronic chip is placed into circulation, and said parameter x being linked by a mathematical relationship to a value of a random number r, the method comprising the hard-wired electronic chip calculating an authentication value V from input parameters, and said device comprising:

a serial pseudo-random generator for producing a random number r specific to a transaction;

first memory means for storing in the hard-wired electronic chip, before the hard-wired electronic chip is placed into circulation, the one or more values of the parameter x calculated by the application before the hard-wired electronic chip is placed into circulation and which are linked by the mathematical relationship to the value of the random number r;

means for sending the parameter x linked to the random number r specific to the transaction from the hard-wired electronic chip to the application;

means for executing a serial function having as input parameters at least the random number r specific to the transaction and a private key s belonging to an asymmetrical pair of keys and providing as output a parameter y; and output means configured to construct an authentication value V from at least the parameter y.

\* \* \* \* \*

UNITED STATES PATENT AND TRADEMARK OFFICE
CERTIFICATE OF CORRECTION

PATENT NO. : 7,590,846 B2  
APPLICATION NO. : 10/761040  
DATED : September 15, 2009  
INVENTOR(S) : Marc Girault Page 1 of 1

It is certified that error appears in the above-identified patent and that said Letters Patent is hereby corrected as shown below:

On the Title Page, insert

-- (30)  Foreign Application Priority Data

January 24, 2003 (FR)                          03 01108 --

Signed and Sealed this
Twenty-third Day of July, 2013

Teresa Stanek Rea
*Acting Director of the United States Patent and Trademark Office*